(12) United States Patent
Ogawa et al.

(10) Patent No.: US 11,319,912 B2
(45) Date of Patent: May 3, 2022

(54) ELECTROMAGNETIC VALVE DRIVER

(71) Applicant: KEIHIN CORPORATION, Tokyo (JP)

(72) Inventors: Atsushi Ogawa, Shioya-gun (JP);
Motoaki Kato, Shioya-gun (JP); Kengo Nomura, Shioya-gun (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/110,852

(22) Filed: Dec. 3, 2020

(65) Prior Publication Data

US 2021/0222655 A1     Jul. 22, 2021

(30) Foreign Application Priority Data

Jan. 20, 2020    (JP) ............................. JP2020-007025

(51) Int. Cl.
*F02M 51/06*      (2006.01)
*B60R 16/033*     (2006.01)

(52) U.S. Cl.
CPC ......... *F02M 51/061* (2013.01); *B60R 16/033* (2013.01)

(58) Field of Classification Search
CPC ........ F02D 41/20; F02D 41/345; F02D 41/34; F02D 2041/2058; F02D 2041/2055; F02D 41/30; Y02T 10/40; F02M 65/00; F02M 51/061; B60R 16/033

USPC .......................................................... 123/294
See application file for complete search history.

(56) References Cited

U.S. PATENT DOCUMENTS

| | | | |
|---|---|---|---|
| 2004/0118384 A1* | 6/2004 | Oyama ............... | F02D 41/3082 123/479 |
| 2011/0084755 A1* | 4/2011 | Inagaki ................ | G11C 27/024 327/427 |
| 2014/0210462 A1* | 7/2014 | Yamamoto ............. | G01R 33/07 324/251 |
| 2020/0072153 A1* | 3/2020 | Inaba ...................... | F02D 41/20 |

FOREIGN PATENT DOCUMENTS

JP          2000110640 A     4/2000

* cited by examiner

*Primary Examiner* — Yi-Kai Wang
(74) *Attorney, Agent, or Firm* — Cantor Colburn LLP

(57) ABSTRACT

An electromagnetic valve driver includes: an electric power feeder configured to apply a power voltage obtained by switching a battery voltage to one end of an electromagnetic coil of an electromagnetic valve; a detector configured to detect a drive current flowing through the electromagnetic coil; and a power supply configured to supply power to the detector. The electric power feeder adjusts the drive current by operating in a state in which the power voltage is applied to the electromagnetic coil on the basis of a detection value of the detector. The power supply supplies the power obtained by sampling and holding a reference power in a period excluding a switching period of the battery voltage in the electric power feeder to the detector.

4 Claims, 4 Drawing Sheets

ELECTROMAGNETIC VALVE DRIVER

CROSS-REFERENCE TO RELATED APPLICATION

The present invention claims priority under 35 U.S.C. § 119 to Japanese Patent Application No. 2020-007025, filed Jan. 20, 2020, the entire content of which is incorporated herein by reference.

BACKGROUND OF THE INVENTION

Field of the Invention

The present invention relates to an electromagnetic valve driver.

Description of Related Art

Japanese Unexamined Patent Application, First Publication No. 2000-110640 discloses an electromagnetic valve driver which includes a booster circuit configured to boost an output of a battery (battery power) and supply the boosted output to an electromagnetic coil of a fuel injection valve, an N-channel MOS transistor configured to turn the electric conduction to the electromagnetic coil on/off, a current detection resistor connected in series to the electromagnetic coil, a constant current control circuit configured to control a drive current of the electromagnetic coil on the basis of a terminal voltage of the current detection resistor, and the like, in which an output of the booster circuit (boost power) is supplied to the fuel injection valve at the time of starting driving of the fuel injection valve and battery power is supplied to the fuel injection valve when a holding current is driven at the time of starting driving.

SUMMARY OF THE INVENTION

Incidentally, since this electromagnetic valve driver includes, for example, an electric power switching element configured to switch electric power such as a chopper circuit configured to switch to the output electric power of a battery such as a booster circuit, noise caused due to a switching operation of the electric power switching element (hereinafter referred to as "switching noise") propagates to the supply of power to a current detector.

For this reason, in the electromagnetic valve driver, switching noise acts as a disturbance in the detection of a drive current of an electromagnetic coil in which a current detection resistor is utilized. Thus, there is a problem that it may not be possible to detect a drive current with high accuracy.

The present invention was made in view of the above circumstances, and an object thereof is to improve the detection accuracy of a drive current of an electromagnetic valve by reducing or preventing the influence of switching noise.

In order to achieve the above object, the present invention adopts the following aspects.

(1) That is to say, an electromagnetic valve driver according to an aspect of the present invention includes: an electric power feeder configured to apply a power voltage obtained by switching a battery voltage to one end of an electromagnetic coil of an electromagnetic valve; a detector configured to detect a drive current flowing through the electromagnetic coil; and a power supply configured to supply power to the detector, wherein the electric power feeder adjusts the drive current by operating in a state in which the power voltage is applied to the electromagnetic coil on the basis of a detection value of the detector, and the power supply supplies the power obtained by sampling and holding a reference power in a period excluding a switching period of the battery voltage in the electric power feeder to the detector.

(2) In the above (1), the following constitution may be adopted: the electric power feeder includes a booster circuit configured to boost the battery voltage by switching the battery voltage to generate the power voltage, wherein the power supply samples and holds the reference power in a period excluding the switching period of the battery voltage in the booster circuit.

(3) In the above (2), the electric power feeder may selectively select the power voltage obtained using the booster circuit and the battery voltage, and apply the selected power voltage to the electromagnetic coil.

(4) In the above (1), the power supply may include a sample and hold circuit configured to sample and hold the reference power in a period excluding the switching period of the battery voltage.

(5) In the above (2), the power supply may include a sample and hold circuit configured to sample and hold the reference power in a period excluding the switching period of the battery voltage.

(6) In the above (3), the power supply may include a sample and hold circuit configured to sample and hold the reference power in a period excluding the switching period of the battery voltage.

(7) In any one of the above (1) to (6), the electromagnetic valve may be a fuel injection valve configured to directly inject a fuel to a cylinder in a direct injection engine.

According to each of the above aspects of the present invention, it is possible to improve the detection accuracy of a drive current of an electromagnetic valve by reducing or preventing the influence of switching noise.

DETAILED DESCRIPTION OF THE INVENTION

An embodiment of the present invention will be described below with reference to the drawings.

A fuel injection valve driver K according to this embodiment is an electromagnetic valve driver configured to drive a fuel injection valve B (an electromagnetic valve) and drives the fuel injection valve B on the basis of a battery voltage (battery power) supplied from an external battery and an external control command similarly input from an external high-ordered control system.

Figure 1:
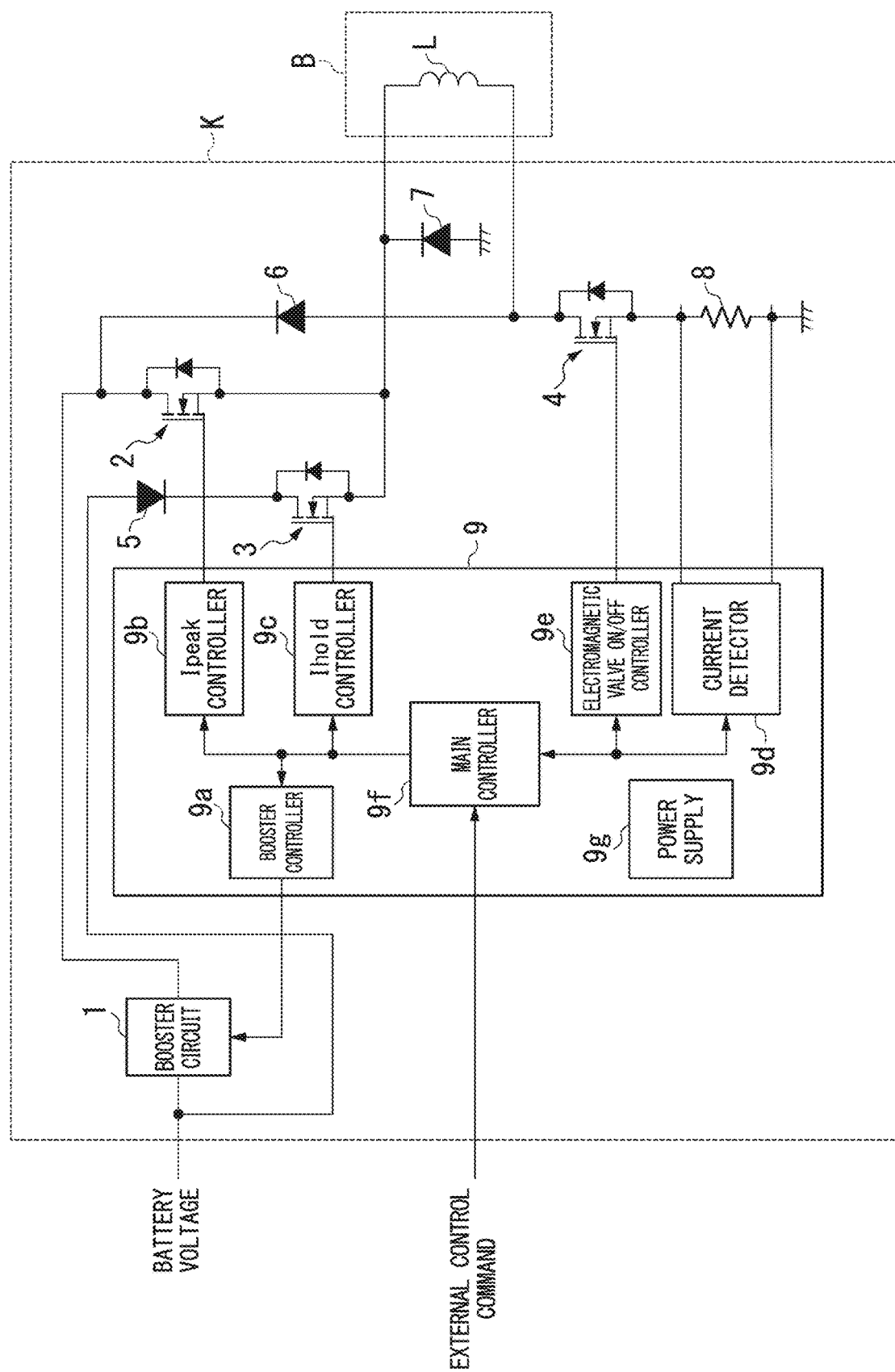
FIG. 1 is a circuit diagram illustrating a constitution of a fuel injection valve driver according to an embodiment of the present invention.

The fuel injection valve B includes an electromagnetic coil L illustrated in FIG. 1 and is an electromagnetic valve (a solenoid valve) configured to directly inject a fuel into a cylinder of a direct injection gasoline engine installed in a vehicle. That is to say, the fuel injection valve driver K has, as a target to be driven, the fuel injection valve B (an electromagnetic valve) in which a fuel flow path is opened and closed by moving a valve body using a magnetic force generated due to the electromagnetic coil L.

As illustrated in FIG. 1, the fuel injection valve driver K includes a booster circuit 1, a first semiconductor switch 2, a second semiconductor switch 3, a third semiconductor switch 4, a first diode 5, a second diode 6, a third diode 7, a current detection resistor 8, a control integrated circuit (IC) 9, and the like.

As illustrated in FIG. 1, the control IC 9 includes a booster controller 9a, an Ipeak controller 9b, an Ihold controller 9c, a current detector 9d, an electromagnetic valve on/off controller 9e, a main controller 9f, and a power supply 9g.

The booster circuit 1 is a chopper circuit configured to boost the battery voltage input from the battery to a predetermined boosted voltage. That is to say, the booster circuit 1 includes a booster switch configured to switch a battery voltage on the basis of a boost control signal (a boost pulse) and outputs a boosted voltage obtained through an operation of the booster switch to the first semiconductor switch 2 as a power voltage.

A boost ratio which is a ratio of the boosted voltage to the battery voltage is set using a duty ratio of a boost pulse and is, for example, about 2 to 10. A boost ratio of the booster circuit 1 is controlled using a boost pulse input from the booster controller 9a in the control IC 9. The booster circuit 1 has a regenerative function capable of outputting a regenerative current which will be described later to the battery.

The first semiconductor switch 2 is a MOS transistor as illustrated in the drawing and is provided between an output end of the booster circuit 1 and one end of the electromagnetic coil L. That is to say, the first semiconductor switch 2 includes a drain terminal connected to the output end of the booster circuit 1, a source terminal connected to the one end of the electromagnetic coil L, and a gate terminal connected to an output end of the Ipeak controller 9b. An ON/OFF (closing/opening) operation of the first semiconductor switch 2 is controlled by the Ipeak controller 9b.

The second semiconductor switch 3 is a MOS transistor as in the first semiconductor switch 2 described above, and is provided between a cathode terminal of the first diode 5 and the one end of the electromagnetic coil L. That is to say, the second semiconductor switch 3 includes a drain terminal connected to the cathode terminal of the first diode 5, a source terminal connected to the one end of the electromagnetic coil L, and a gate terminal connected to an output end of the Ihold controller 9c. An ON/OFF (closing/opening) operation of the second semiconductor switch 3 is controlled by the Ihold controller 9c.

The first semiconductor switch 2 and the second semiconductor switch 3 function as selection switches configured to selectively select a boosted voltage (a power voltage) obtained using the booster circuit 1 and the battery voltage, and apply the selected boosted voltage to the electromagnetic coil L of the fuel injection valve B (an electromagnetic valve).

The third semiconductor switch 4 is a MOS transistor as in the first semiconductor switch 2 and the second semiconductor switch 3, and includes a drain terminal connected to the other end of the electromagnetic coil L, a source terminal connected to one end of the current detection resistor 8, and a gate terminal connected to an output end of the electromagnetic valve on/off controller 9e. An ON/OFF (closing/opening) operation of the third semiconductor switch 4 is controlled by the electromagnetic valve on/off controller 9e.

The first diode 5 includes an anode terminal connected to an output end of the battery and a cathode terminal connected to the drain terminal of the second semiconductor switch 3. The first diode 5 is a backflow prevention diode in which the output end of the booster circuit 1 is directly connected to the output end of the battery when both of the first semiconductor switch 2 and the second semiconductor switch 3 are in an ON state (a closed state) and a current is prevented from flowing from the booster circuit 1 into the battery.

The second diode 6 includes an anode terminal connected to the other end of the electromagnetic coil L and a cathode terminal connected to the drain terminal of the first semiconductor switch 2. The second diode 6 is a regenerative diode configured to supply (regenerate) a regenerative current output from the electromagnetic coil L to the battery via the booster circuit 1. The third diode 7 is a regenerative diode which includes a cathode terminal connected to the one end of the electromagnetic coil L and an anode terminal connected to a GND (a reference potential) and forms a flow path of the regenerative current.

The current detection resistor 8 is a shunt resistor which includes one end connected to the source terminal of the third semiconductor switch 4 and the other end connected to the GND (a reference potential). That is to say, the current detection resistor 8 is connected in series to the electromagnetic coil L via the third semiconductor switch 4, and a drive current flowing through the electromagnetic coil L passes through the current detection resistor 8. In other words, a voltage (a detection voltage) according to a magnitude of a drive current is generated between the one end and the other end of the current detection resistor 8. Both ends (the one end and the other end) of the current detection resistor 8 are individually connected to input ends included in the current detector 9d.

The control IC 9 is an IC configured to control the booster circuit 1, the first semiconductor switch 2, the second semiconductor switch 3, and the third semiconductor switch 4 on the basis of a command signal (an external control command) input from the high-ordered control system, and includes a plurality of input terminals and output terminals. In the control IC 9, the booster controller 9a generates a boost control signal (a boost pulse) on the basis of a control command input from the main controller 9f and outputs the generated boost control signal to the booster circuit 1. The boost control signal is a control signal for controlling an operation of the booster circuit 1.

The Ipeak controller 9b generates a first gate signal for controlling the first semiconductor switch 2 on the basis of the control command input from the main controller 9f, and outputs the generated first gate signal to the gate terminal of the first semiconductor switch 2. The Ihold controller 9c generates a second gate signal for controlling the second semiconductor switch 3 on the basis of the control command input from the main controller 9f, and outputs the generated second gate signal to the gate terminal of the second semiconductor switch 3.

Figure 2:
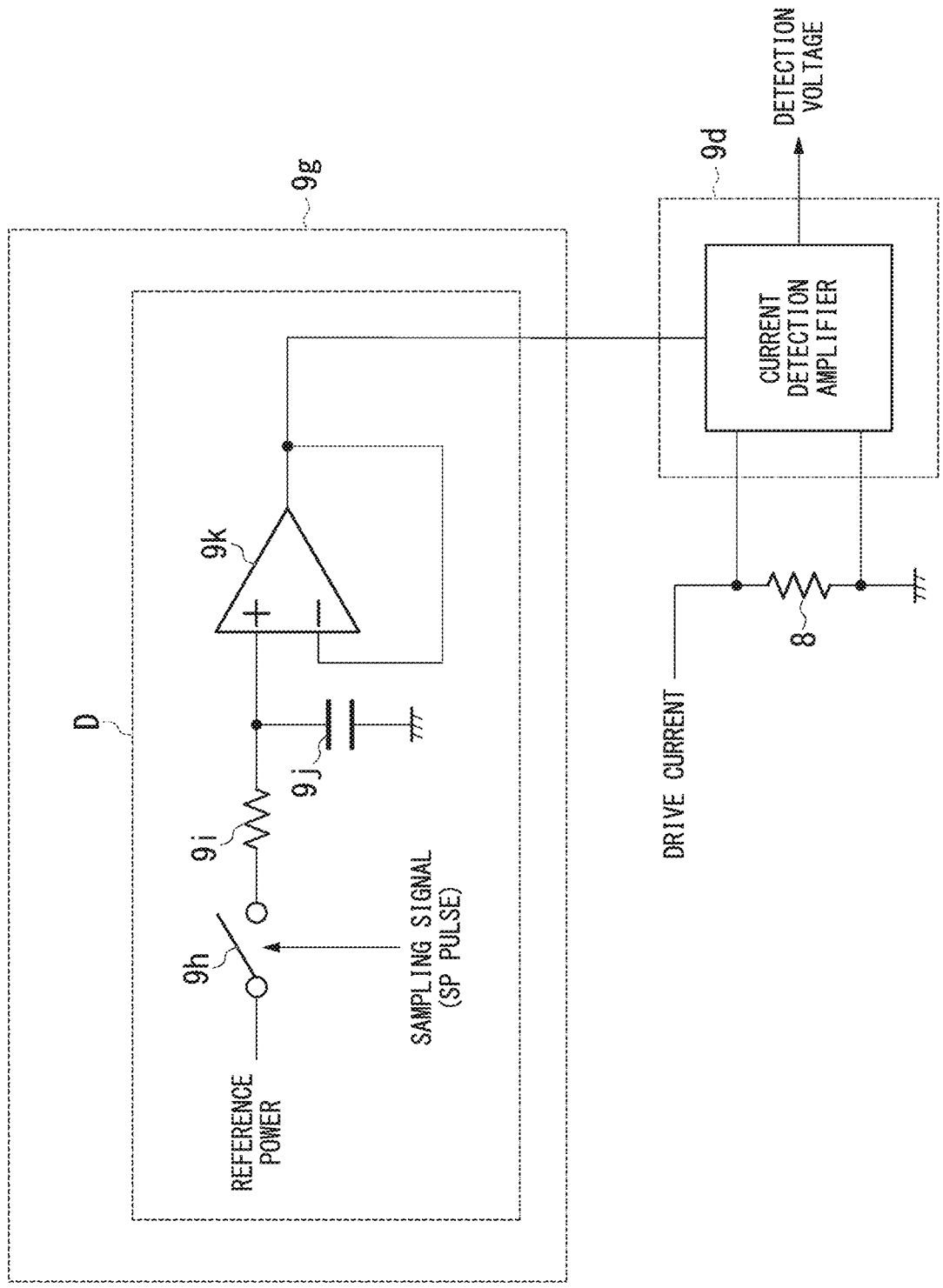
FIG. 2 is a circuit diagram illustrating a constitution of a power distribution circuit in the embodiment.

The current detector 9d includes a pair of input ends of which one input end is connected to the one end of the current detection resistor 8 and the other input end is connected to the other end of the current detection resistor 8. That is to say, a detection voltage generated by the current detection resistor 8 on the basis of the drive current is input to the current detector 9d. The current detector 9d calculates a drive current detection value indicating a magnitude of the drive current on the basis of the detection voltage and outputs the drive current detection value to the main controller 9f. As illustrated in FIG. 2, the current detector 9d includes a current detection amplifier configured to directly amplify the detection voltage.

The electromagnetic valve on/off controller 9e generates a third gate signal for controlling the third semiconductor switch 4 on the basis of the control command input from the main controller 9f and outputs the generated third gate signal to the gate terminal of the third semiconductor switch 4.

The main controller 9f generates a control command on the basis of the drive current detection value input from the current detector 9d and the external control command input from the external high-ordered control system, and outputs the generated control command to the booster controller 9a, the Ipeak controller 9b, the Ihold controller 9c, and the electromagnetic valve on/off controller 9e. The external control command includes information regarding an operation timing of the fuel injection valve B, that is, an electric conduction timing to the electromagnetic coil L.

The power supply 9g supplies power to the booster controller 9a, the Ipeak controller 9b, the Ihold controller 9c, the current detector 9d, the electromagnetic valve on/off controller 9e, and the main controller 9f. For example, the power supply 9g performs voltage stabilization processing on the power which has been input to a power terminal of the control IC 9 and then supplies the stabilized electric power to each of the booster controller 9a, the Ipeak controller 9b, the Ihold controller 9c, the current detector 9d, the electromagnetic valve on/off controller 9e, and the main controller 9f.

The booster circuit 1, the first semiconductor switch 2, the second semiconductor switch 3, the first diode 5, the booster controller 9a, the Ipeak controller 9b, the Ihold controller 9c, the electromagnetic valve on/off controller 9e, and the main controller 9f among the above-described constituent elements constitute an aspect of an electric power feeder in the present invention. Furthermore, the third semiconductor switch 4, the current detection resistor 8, and the current detector 9d constitute an aspect of a detector in the present invention.

That is to say, the electric power feeder applies a boosted voltage (a power voltage) obtained by switching the battery voltage using the booster switch of the booster circuit 1 to the one end of the electromagnetic coil L of the fuel injection valve B (an electromagnetic valve), and adjusts the drive current by operating in a state in which the boosted voltage (a power voltage) is applied to the electromagnetic coil L on the basis of the drive current detection value (a detection value) of the detector.

Subsequently, a main part circuit constitution of the power supply 9g, that is, a constitution of a power distribution circuit D configured to distribute and supply power to the current detector 9d will be described with reference to FIG. 2.

The power distribution circuit D is an electric power circuit configured to distribute and supply reference power generated inside the power supply 9g to the current detection amplifier of the current detector 9d. The power distribution circuit D includes a sample and hold circuit as an input circuit as illustrated in FIG. 2. The sample and hold circuit includes an electronic switch 9h, a hold resistor 9i, a voltage holding capacitor 9j, and an operational amplifier 9k.

The electronic switch 9h includes one end configured to receive reference power as an input and the other end connected to one end of the hold resistor 9i. An ON/OFF (closing/opening) operation of the electronic switch 9h is controlled using a sampling signal (an SP pulse) generated using the power supply 9g on the basis of the control command input from the main controller 9f.

The hold resistor 9i includes one end connected to the other end of the electronic switch 9h and the other end connected to one end of the voltage holding capacitor 9j and a positive phase input end of the operational amplifier 9k. The voltage holding capacitor 9j includes one end connected to the other end of the hold resistor 9i and the positive phase input end of the operational amplifier 9k, and the other end is grounded.

The hold resistor 9i and the voltage holding capacitor 9j constitute an integrating circuit having a time constant determined using a resistance value of the hold resistor 9i and a capacitance of the voltage holding capacitor 9j, and integrate the reference power in a state in which the electronic switch 9h is closed. That is to say, a voltage at one end of the voltage holding capacitor 9j is a value obtained by integrating (performing charging with) the reference power with the time constant.

The operational amplifier 9k includes a positive phase input end connected to the other end of the hold resistor 9i and the one end of the voltage holding capacitor 9j, and a reverse phase input end connected to an output end of the operational amplifier 9k. That is to say, the operational amplifier 9k constitutes a voltage follower, and functions as an impedance conversion circuit (a buffer circuit) configured to convert an impedance of the integrating circuit connected to the positive phase input end into a low impedance.

The sample and hold circuit sets a closing period of the electronic switch 9h determined using the sampling signal to a timing excluding a switching timing of the battery voltage in the booster circuit 1. That is to say, the sample and hold circuit takes in reference power in a period excluding a switching period of the booster circuit 1. Furthermore, the power distribution circuit D including the sample and hold circuit supplies power (direct current power) obtained by sampling the reference power to the current detection amplifier of the current detector 9d in a period excluding the switching period of the booster circuit 1.

An operation of the fuel injection valve driver K constituted in this way will be described in detail below with reference to FIGS. 3A through FIGS. 4C.

Figure 3A:
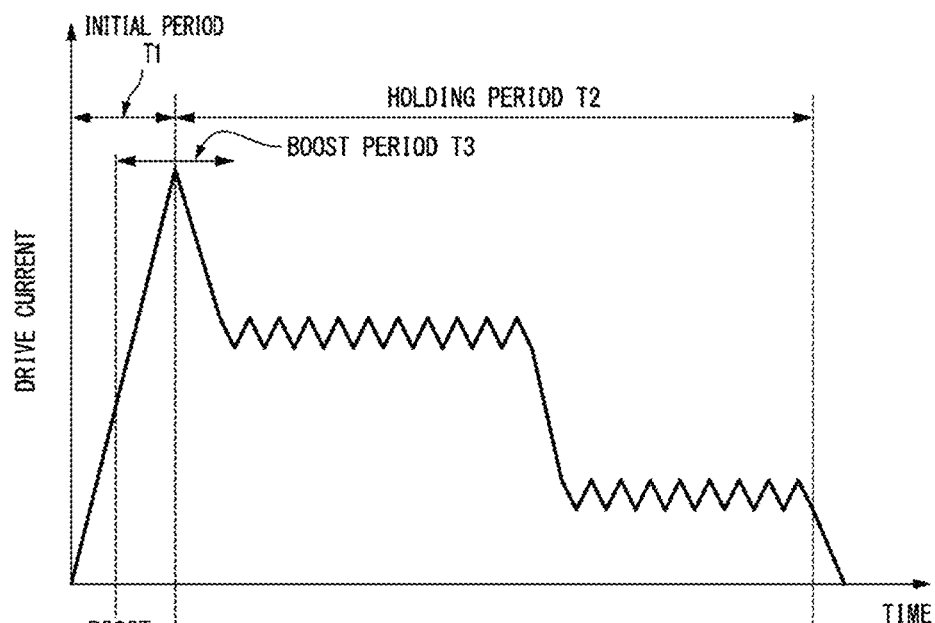
FIGS. 3A to FIG. 3C is a timing chart for describing an operation of the fuel injection valve driver according to the embodiment.
Figure 3B:
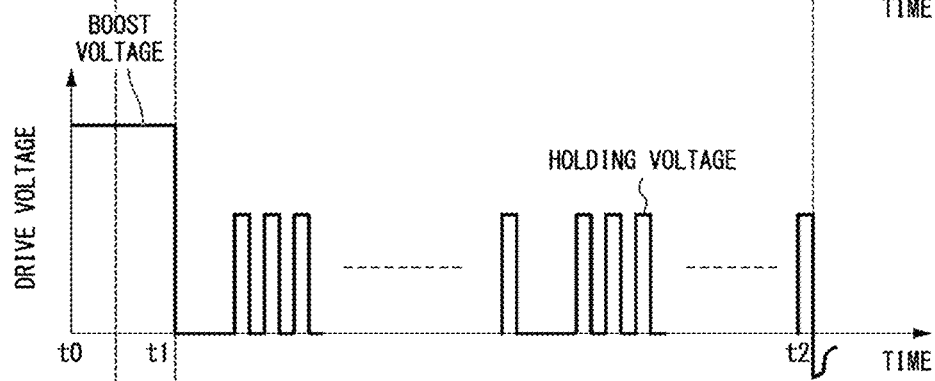
Figure 3C:
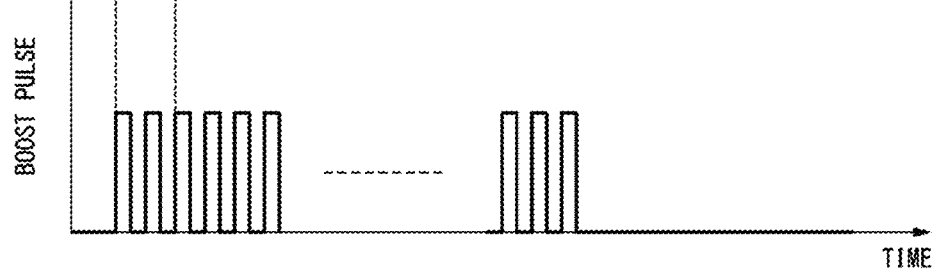

When the fuel injection valve B is driven from a closed state to an open state using the fuel injection valve driver K, as illustrated in FIG. 3A to FIG. 3C, the control IC 9 causes a boosted voltage generated by the booster circuit 1 to be supplied to the electromagnetic coil L as a power voltage in an initial period T1 (a period of time t0 to t1) at the time of starting driving. Furthermore, the control IC 9 causes a battery voltage to be supplied to the electromagnetic coil L as a power voltage instead of the boosted voltage in a holding period T2 after the initial period T1 (a period of time t1 to t2: at the time of driving a holding current).

That is to say, in the initial period T1, when the booster controller 9a outputs a boost pulse to the booster switch of the booster circuit 1, the booster circuit 1 outputs a boosted voltage to the drain terminal of the first semiconductor switch 2. Furthermore, in the initial period T1, when the Ipeak controller 9b outputs the first gate signal to the gate terminal of the first semiconductor switch 2, the first semiconductor switch 2 is set to an ON state. In addition, when the electromagnetic valve on/off controller 9e outputs the third gate signal to the gate terminal of the third semiconductor switch 4, the third semiconductor switch 4 is set to an ON state.

As a result, in the initial period T1, a relatively high boosted voltage is applied to the one end of the electromagnetic coil L as illustrated in FIG. 3B, and thus a peak-shaped rising current flows through the electromagnetic coil L as illustrated in FIG. 3A. Such a peak-shaped rising current increases a speed of a valve opening operation of the fuel injection valve B.

Also, in the holding period T2, when the Ihold controller 9c outputs the second gate signal to the second semiconductor switch 3, the second semiconductor switch 3 is set to an ON state. Furthermore, when the electromagnetic valve on/off controller 9e outputs the third gate signal to the gate terminal of the third semiconductor switch 4, the third semiconductor switch 4 is set to an ON state.

Thus, in the holding period T2, as illustrated in FIG. 3B, a holding voltage lower than a boosted voltage is applied to the electromagnetic coil L. As a result, a holding current for holding an open state of the fuel injection valve B flows through the electromagnetic coil L. That is to say, the Ihold controller 9c supplies a pulse width modulation (PWM) signal having a predetermined duty ratio to the second semiconductor switch 3 as a second gate signal, and as a result, causes the holding voltage to be intermittently supplied to the electromagnetic coil L in accordance with the duty ratio.

Also, the Ihold controller 9c sets a duty ratio of the second gate signal on the basis of the drive current detection value of the current detector 9d included in a control command of the main controller 9f. That is to say, when the Ihold controller 9c sets the duty ratio of the second gate signal on the basis of a magnitude of the drive current flowing through the electromagnetic coil L, feedback control is performed so that the drive current maintains a predetermined target value.

Since a predetermined holding current is supplied to the electromagnetic coil L through such feedback control in the holding period T2 as illustrated in FIG. 3A, the open state of the fuel injection valve B is maintained. Furthermore, for example, when the duty ratio of the second gate signal is changed in two stages in the holding period T2, the holding current is changed in two stages as illustrated in FIG. 3A.

Here, although waveforms of FIG. 3A and FIG. 3B illustrate one waveform of the fuel injection valve, for example, when a boosted voltage is supplied through a multi-cylinder fuel injection valve using one booster circuit, as illustrated in FIG. 3C, the booster switch of the booster circuit 1 continues to switch the battery voltage in a boost period T3. That is to say, noise (switching noise) caused due to the switching operation of the booster switch continues to be generated regardless of the initial period T1 and the holding period T2.

Also, the switching noise acts as a disturbance with respect to the reference power generated using the power supply 9g. That is to say, level fluctuations may occur as a disturbance in the reference power at a timing at which a boost pulse translations from a L (low) level to a H (high) level and a period in which a boost pulse translations from a H (high) level to a L (low) level.

Figure 4A:
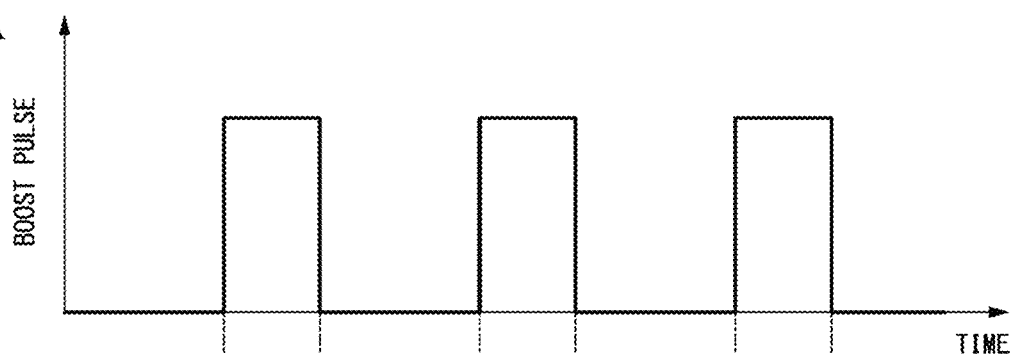
FIGS. 4A to FIG. 4C is a timing chart for describing an operation of a main part of the power distribution circuit in the embodiment.
Figure 4B:
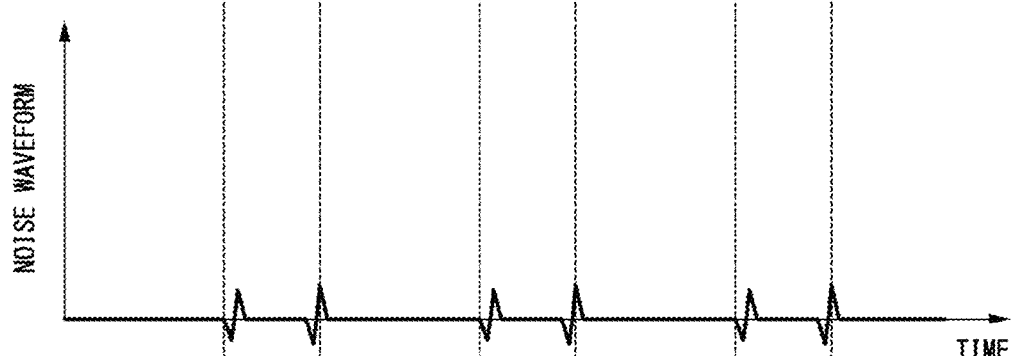
Figure 4C:
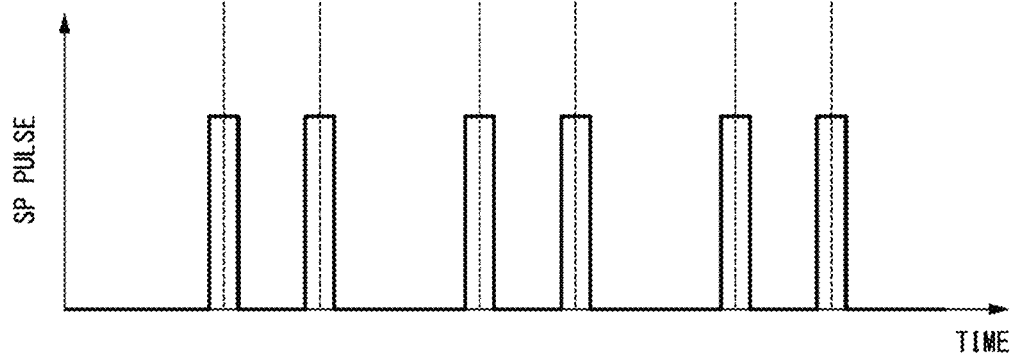

In order to prevent the influence of such switching noise, the power distribution circuit D of the power supply 9g samples and holds the reference power at timings and a period excluding a transition period of a boost pulse. That is to say, since a L (low) period of an SP pulse in the power distribution circuit D, that is, a closing period of the electronic switch 9h, is set to a period excluding the transition period of the boost pulse as illustrated in FIG. 4A to FIG. 4C, the power distribution circuit D samples and holds the reference power in timings and a period excluding the transition period of the boost pulse.

According to the fuel injection valve driver K associated with this embodiment, the power distribution circuit D supplies power (DC power) obtained by sampling and holding the reference power in the period excluding the switching period of the booster circuit 1 to the current detector 9d. For this reason, it is possible to reduce or prevent the influence of the switching noise of the booster circuit 1. Thus, it is possible to improve the detection accuracy of the drive current of the fuel injection valve B (an electromagnetic valve) in the current detector 9d. As a result, according to the fuel injection valve driver K, it is possible to realize high-precision driving of the fuel injection valve B.

The present invention is not limited only to the above embodiment, and for example, the following modifications can be conceived.

(1) Although the holding voltage is generated using the battery voltage in the above embodiment, the present invention is not limited only to this constitution. A holding voltage may be generated using a second booster circuit provided separately. In this case, since two booster circuits, that is, two booster switches are present, it is necessary to set a transition timing and period of an SP pulse to a period excluding a transition period of each boost pulse corresponding to each of the booster switches.

(2) In the above embodiment, attention is paid to the switching noise caused due to the switching operation of the booster switch of the booster circuit 1 and the elimination of the influence thereof has been described. The present invention is not limited thereto. Attention may be paid to the switching noise caused due to switching operations of circuits other than the booster circuit 1, and a constitution in which the influence thereof is excluded may be provided.

(3) Although the fuel injection valve B is a target to be driven in the above embodiment, the present invention is not limited thereto. The present invention can also be applied to driving of various electromagnetic valves other than the fuel injection valve B.

(4) Although the fuel injection valve B of a direct injection engine is a target to be driven in the above embodiment, the present invention is not limited thereto. The present invention can be applied to driving of a fuel injection valve other than a direct injection engine.

(5) In the above embodiment, the fuel injection valve driver K is constituted to include the booster circuit 1, the first semiconductor switch 2, the second semiconductor switch 3, the third semiconductor switch 4, the first diode 5, the second diode 6, the third diode 7, the current detection resistor 8, the control IC 9, and the like. Furthermore, the control IC 9 is constituted to include the booster controller 9a, the Ipeak controller 9b, the Ihold controller 9c, the current detector 9d, the electromagnetic valve on/off controller 9e, and the main controller 9f. However, the present invention is not limited to this constitution. The constitution illustrated in FIG. 1 is merely an example of the electromagnetic valve driver according to the present invention.

(6) Although the sample and hold circuit is constituted as illustrated in FIG. 2 in the above embodiment, this constitution is merely an example.

(7) Although the electromagnetic valve on/off controller 9e controls the third semiconductor switch 4 in the above embodiment, the present invention is not limited to this constitution. The third semiconductor switch 4 may be controlled using the Ihold controller 9c instead of the electromagnetic valve on/off controller 9e.

EXPLANATION OF REFERENCES

B Fuel injection valve
K Fuel injection valve drive circuit

L Electromagnetic coil
D Power distribution circuit
1 Booster circuit (electric power feeder circuit)
2 First semiconductor switch
3 Second semiconductor switch
4 Third semiconductor switch
5 First diode
6 Second diode
7 Third diode
8 Current detection resistor
9 Control IC
9a Booster controller
9b Ipeak controller
9c Ihold controller
9d Current detector
9e Electromagnetic valve on/off controller
9f Main controller
9g Power supply
9h Electronic switch
9i Hold resistor
9j Voltage holding capacitor
9k Operational amplifier

What is claimed is:

1. An electromagnetic valve driver, comprising:
an electric power feeder configured to apply a power voltage obtained by switching a battery voltage to one end of an electromagnetic coil of an electromagnetic valve;
a detector configured to detect a drive current flowing through the electromagnetic coil; and
a power supply configured to supply power to the detector,
wherein the electric power feeder adjusts the drive current by operating in a state in which the power voltage is applied to the electromagnetic coil on the basis of a detection value of the detector,
wherein the power supply includes a sample and hold circuit configured to sample and hold a reference power in a period excluding a switching period of the battery voltage, and
wherein the power supply supplies the power obtained by sampling and holding the reference power in the period excluding the switching period of the battery voltage in the electric power feeder to the detector.

2. The electromagnetic valve driver according to claim 1, wherein the electric power feeder includes a booster circuit configured to boost the battery voltage by switching the battery voltage to generate the power voltage,
wherein the power supply samples and holds the reference power in the period excluding the switching period of the battery voltage in the booster circuit.

3. The electromagnetic valve driver according to claim 2, wherein the electric power feeder selectively selects the power voltage obtained using the booster circuit and the battery voltage, and applies the selected power voltage to the electromagnetic coil.

4. The electromagnetic valve driver according to claim 1, wherein the electromagnetic valve is a fuel injection valve configured to directly inject a fuel to a cylinder in a direct injection engine.

* * * * *